May 19, 1953  F. E. MUNSCHAUER  2,639,014
FLUID AND SPRING OPERATED CLUTCH
Filed Aug. 25, 1950  2 Sheets-Sheet 1

Inventor
Frederick E. Munschauer
by
Bean, Brooks, Buckley & Bean
Attorneys

May 19, 1953  F. E. MUNSCHAUER  2,639,014
FLUID AND SPRING OPERATED CLUTCH
Filed Aug. 25, 1950  2 Sheets-Sheet 2
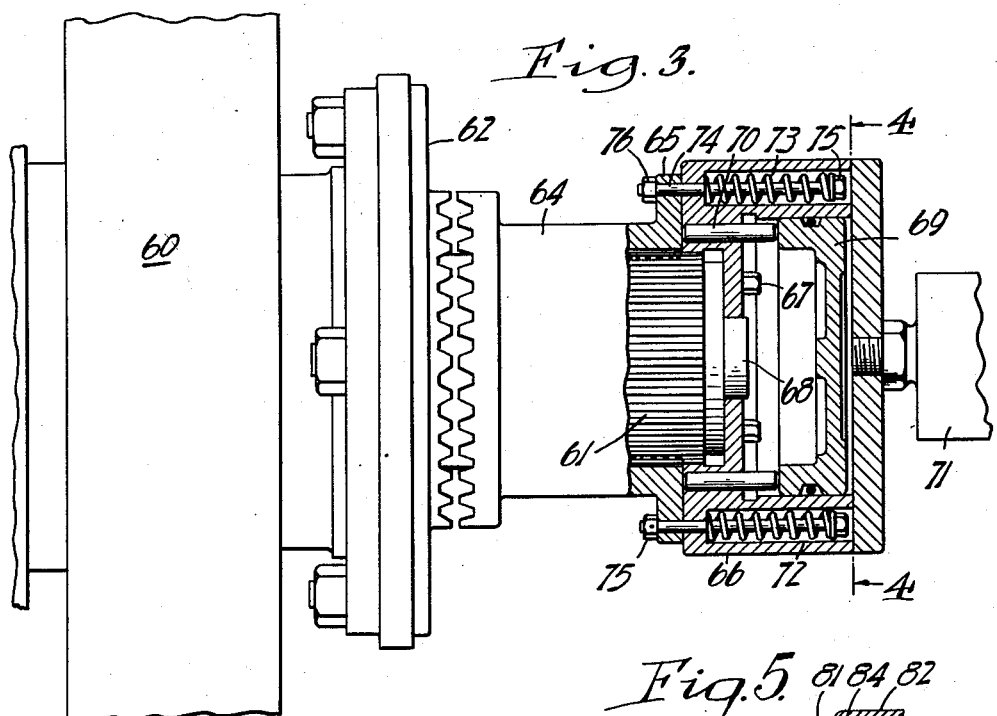
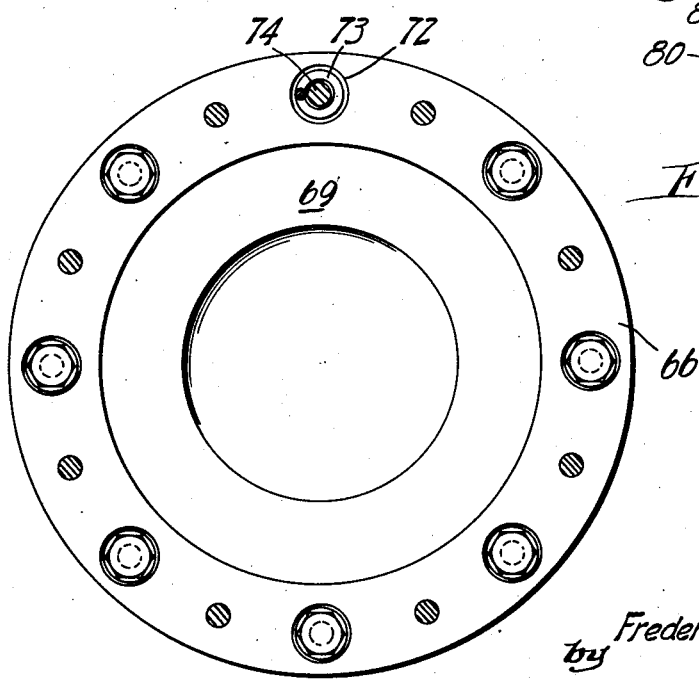
Inventor
Frederick E. Munschauer
by
Bean, Brooks, Buckley & Bean
Attorneys Patented May 19, 1953

2,639,014

UNITED STATES PATENT OFFICE 2,639,014

FLUID AND SPRING OPERATED CLUTCH

Frederick E. Munschauer, Buffalo, N. Y., assignor to Niagara Machine & Tool Works, Buffalo, N. Y.

Application August 25, 1950, Serial No. 181,478

2 Claims. (Cl. 192—85)

This invention relates to drive means for machinery and particularly to a novel clutch arrangement for connecting and disconnecting the driving and driven portions in power driven machines.

The clutch arrangement of the present invention is particularly advantageous in driving such machines as punch presses, power shears, and the like, where relatively high work output subjects the clutch to very considerable loads. However, the teachings and principles of the invention may be applied wherever the inherent advantages thereof may prove desirable. In presses, shears, and the like, the provision of positive drive means is generally desirable and, fundamentally, the present invention provides a novel arrangement of the parts in a positive jaw clutch drive means which is controlled by fluid pressure acting in opposition to spring means.

The clutch mechanism of the present invention differs from those previously proposed mainly in the arrangement and disposition of the spring means which bias the movable clutch element to its disengaged position in the construction of the present invention. The spring means is arranged in such manner that it does not at all affect or control the proportions or design of the principal working components of the clutch mechanism, namely, the drive wheel, the drive shaft, and the fixed and movable jaw clutch elements themselves. In prior constructions the necessary diameters or the axial dimensions or both have been to some degree governed, as to some or all of the four main components here referred to, by the necessity for accommodating the spring means.

Speaking generally, the present invention provides spring means which lie entirely outside of the main confines of the assembled drive shaft, drive wheel, and fixed and movable clutch elements. In fact, in one embodiment of the present invention the entire spring means may be removed from the clutching mechanism with the fluid pressure operating means without disturbing the assembled relation of the drive shaft, drive wheel, and fixed and movable clutch elements.

The spring arrangement of the present invention may, in one embodiment thereof, be so disposed and proportioned that it serves as a shroud or shield for the movable clutch element of the mechanism.

While general reference is made herein to fluid pressure operation, the usual source of fluid pressure energy is compressed air. The present clutch mechanism is simpler in construction than those of the prior art, and the arrangement is such that the action of the compressed air against the piston which engages the clutch is direct and immediate and, therefore, makes for faster clutch engagement and, in fact, also quicker disengagement.

According to the present invention, all parts of the clutch mechanism, excepting the flywheel, are stationary, excepting when the flywheel or other drive wheel and the drive shaft are clutched for joint rotation. Further, when the clutch is disengaged the reaction of the compression coil spring which urges the clutch to disengaged position is borne by parts that remain stationary with the drive shaft. Since the clutch is usually disengaged for the major part of the time when the flywheel is running, this is a material factor.

Several embodiments of the principles of the present invention are illustrated in the accompanying drawing and described in detail in the following specification. It is to be understood, however, that these embodiments are set forth by way of example only, and that the scope of the present invention is not limited, excepting as defined in the appended claims.

In the drawing:

Fig. 3 is a fragmentary elevational view of a modified form of the device of the present invention with a portion thereof shown in longitudinal cross-section;

Fig. 4 is a transverse cross-sectional view, on an enlarged scale, on the line 4—4 of Fig. 3; and Fig. 5 is a fragmentary cross-sectional view, viewed similarly to Fig. 3, but showing a further modification of the means for applying spring force to the movable clutch element.

Figure 1:
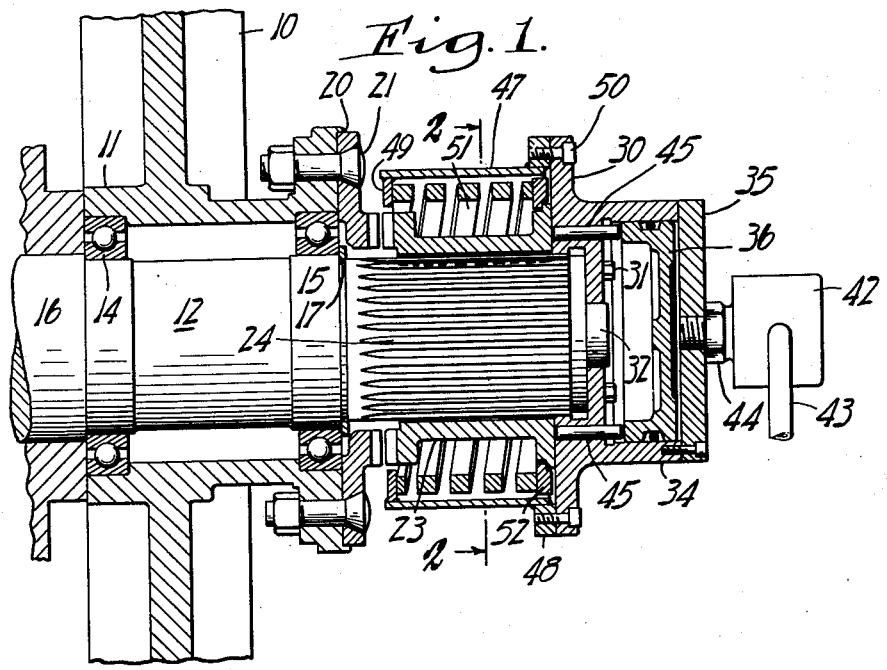
Fig. 1 is a longitudinal fragmentary cross-sectional view through one form of the device of the present invention.
Figure 2:
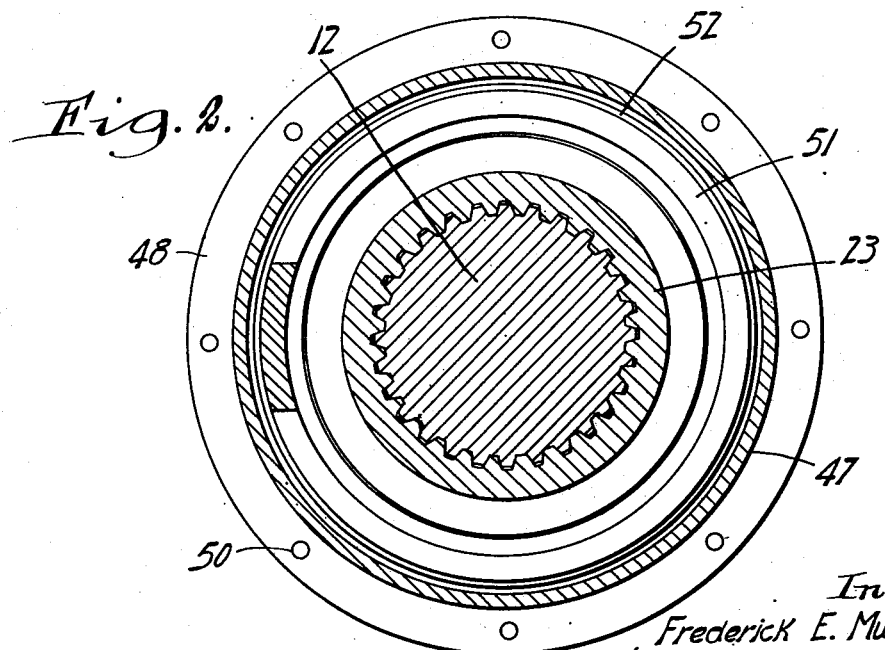
Fig. 2 is a transverse cross-sectional view, on an enlarged scale, on the line 2—2 of Fig. 1.

Like characters of reference denote like parts throughout the several figures of the drawing and, referring to the embodiment illustrated in Figs. 1 and 2, the numeral 10 designates a flywheel, gear, or other driving wheel element having a hub 11. One end portion of a drive shaft is designated 12, and this shaft may comprise a crank shaft of a power press or similar machine wherein the mechanism driven thereby is to be intermittently or selectively operated by successive connection and disconnection of the driving wheel 10 and shaft 12. Shaft 12 may directly comprise the crank shaft or operating shaft of a punch press or analogous machine, or it may comprise an intermediate shaft having further driving connection with the ultimate drive shaft of the machine.

A pair of anti-friction bearings 14 and 15 mount driving wheel 10 for free rotation on shaft 12, the inner race of bearing 14 being in abutment with an enlargement 16 on shaft 12, and the inner race bearing 15 being held against axial disassembly by a retaining ring 17 which seats in an annular groove in shaft 12. The outer races of anti-friction bearings 14 and 15 seat in annular recesses which comprise enlargements at the opposite ends of the central bore of drive wheel 10.

A jaw clutch element 20 is fixed to flywheel 10 and is secured by means of bolts 21. Moveable clutch element 23 is of sleeve form and is internally splined to engage complementary spline formations 24 provided at the end of drive shaft 12, whereby the clutch element 22 is fixed against rotation relative to shaft 12 but is axially movable therealong.

In Fig. 1, the numeral 30 designates an adaptor which supports the entire fluid pressure clutch engaging mechanism and also supports the spring means for biasing movable clutch element to disengaged position. Adaptor 30 is secured to the end of shaft 12 by means of screws 31, and shaft 12 has a reduced end portion 32 which engages a central opening in adaptor 30 to accurately locate the latter. Adaptor 30 is provided with a cylindrical casing portion 34 to provide an operating chamber for a piston 36. Cover plate 35 is provided centrally thereof with a rotary fluid connector 42.

The body of connector 42 remains stationary and is connected with a relatively stationary pressure supply pipe 43, while an outlet stem portion 44 is screwed into cover plate 35 and is freely rotatable relative to the body 42 of the connector. The interior details of the connector need not be illustrated or described since these devices are freely available commercially. The supply pipe 43 will, of course, be provided with conventional control valve means which may be selectively manipulated at the will of the operator to apply or not apply air pressure to cylinder 34.

A circularly arranged series of pins 45 is mounted in adaptor 30 for free axial sliding movement and the pins bear at their opposite ends against the end of the skirt of piston 36 and against the adjacent end of slidable clutch element 23. A spring supporting and encasing member is designated 47 in Fig. 1 and comprises a main sleeve portion having an external annular flange 48 welded to one of its ends and an internal annular flange 49 welded to its opposite end.

External flange 48 is fixed to adaptor 30 by means of screws 50 and a compression coil spring 51 seats at one end against the interior of internal flange 49. The other end of spring 51 applies an axial biasing force against movable clutch element 23 by engagement against a ring 52 which has an internal annular seat for engagement with a complementary peripheral formation on clutch element 23. Ring 52 is formed separately from movable clutch element 23 to simplify the latter and to render it of more symmetrical formation to facilitate hardening thereof and to minimize warping upon hardening.

Obviously, in this form of the present invention, assembly is effected by introducing the spring encasing member 47 over the end of shaft 12, then placing the spring 51 therein and then applying ring 52 and movable clutch element 23, and finally applying adaptor 30.

Referring to the alternative embodiment illustrated in Figs. 3 and 4, the numeral 60 designates a drive wheel, the numeral 61 a drive shaft having a spline formation, and the numeral 62 a fixed clutch element. These elements are all identical with corresponding elements of the embodiments 1 and 2 and, accordingly, need not be further discussed. Movable clutch element 64 is generally the same as the corresponding element 23 of the first embodiment, excepting as to its end flange which is designated 65 in Fig. 3.

An adaptor 66 is secured by screws 67 and centrally located upon a reduced end formation 68 of shaft 61, all as previously described, and adaptor 66 receives an operating piston 69 and force-transmitting pins 70 which correspond to piston 36 and pins 45, respectively, of the previous embodiment as does a rotary fluid connector 71.

Adaptor 66 is provided with a marginal series of axially extending openings 72 which receive compression coil springs 73. The left-hand ends of spring 73, as viewed in Fig. 3, seat in the ends of the openings 72, and a series of studs 74 pass through the springs 73 and through coaxial openings in adaptor 66 and flange 65 of movable clutch element 64. The studs 74 may comprise bolts having heads 75 bearing against the right-hand ends of the springs 73, as viewed in Fig. 3, and nuts 76 at the opposite ends of these bolts hold flange 65 of clutch element 64 yieldably against the adjacent end of adaptor 66 and may be tightened to selectively determine the degree of tension of the several springs 73.

When fluid pressure is applied to move piston 69 to the left, as viewed in Fig. 3, movable clutch element 64 is moved to a position of engagement by the intervention of pins 70, and this movement is accompanied by movement of flange 65 away from adaptor 66 with a resultant increase in tension of the springs 73. Upon the cutting off of fluid pressure through suitable control means, springs 73 immediately return movable clutch element 64 to its illustrated disengaged position.

The modification illustrated fragmentarily in Fig. 5 is the same as that shown in Figs. 3 and 4, excepting that the movable clutch element, which is designated 80 in Fig. 5, is peripherally grooved to cooperate with a ring 81 which has an internal peripheral groove. An adaptor 82, springs 83, spring studs 84, and nuts 85 correspond exactly with the corresponding elements in Fig. 3. In the alternative embodiment of Fig. 5 the separate ring 81 is employed for the same reason as previously described in conjunction with the embodiments of Figs. 1 and 2 and also because it avoids the necessity of drilling the hardened clutch element 80 to receive the spring studs or bolts.

What is claimed is:

1. Drive means for power presses, shears and like machines comprising a drive shaft, a normally rotating drive wheel mounted on said shaft for free rotation, a jaw clutch element fixed against a face of said wheel, an axially slidable complementary jaw clutch element having an internally splined sleeve portion and interfitting external splines on said drive shaft for movement of the slidable clutch element toward and away from said wheel for connecting and disconnecting the clutch elements, a cylinder element secured to said drive shaft beyond said slidable clutch element and a piston therein movable under the influence of fluid pressure to move the slidable clutch element to engaged position, an external flange at the outer end of the sleeve portion of the clutch element, a sleeve fixed at one end to said cylinder element and telescoping over the slidable clutch element and terminating in an internal flange, and a compression coil spring seated at its opposite ends against said external and internal flanges for urging the slidable clutch element toward the cylinder element to normally disconnect the same.

2. Drive means for power presses, shears and like machines comprising a drive shaft, a normally rotating drive wheel mounted on said shaft for free rotation, a jaw clutch element fixed against a face of said wheel, an axially slidable complementary jaw clutch element having an internally splined sleeve portion and interfitting external splines on said drive shaft for movement of the slidable clutch element toward and away from said wheel for connecting and disconnecting the clutch elements, piston and cylinder means carried by the drive shaft and operable to move the slidable clutch element to engaged position, an external flange on the sleeve portion of the clutch element, a sleeve fixed at one end to said piston and cylinder means and telescoping over the slidable clutch element sleeve and terminating in an internal flange, and a compression coil spring acting between said external and internal flanges for urging the slidable clutch element to disconnected position.

FREDERICK E. MUNSCHAUER.

References Cited in the file of this patent

UNITED STATES PATENTS

| Number | Name | Date |
|---|---|---|
| 746,761 | Taylor | Dec. 15, 1903 |
| 1,879,633 | Olsen et al. | Sept. 27, 1932 |
| 2,221,014 | Williamson | Nov. 12, 1940 |
| 2,437,670 | Adamson | Mar. 16, 1948 |
| 2,472,452 | Wissman | June 7, 1949 |
| 2,505,600 | Wissman | Apr. 25, 1950 |
| 2,553,376 | Lourreau | May 15, 1951 |
| 2,593,521 | Ball | Apr. 22, 1952 |

FOREIGN PATENTS

| Number | Country | Date |
|---|---|---|
| 529,822 | Great Britain | Nov. 28, 1940 |